Sept. 29, 1925.

A. A. GAZDA 1,555,244

MOTOR CONTROL SYSTEM

Original Filed Feb. 3, 1917

WITNESSES:
William Siler
J. R. Langley.

INVENTOR
Adolph A. Gazda.
BY
Wesley G. Carr
ATTORNEY

Patented Sept. 29, 1925.

1,555,244

UNITED STATES PATENT OFFICE.

ADOLPH A. GAZDA, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

Application filed February 8, 1917, Serial No. 146,461. Renewed November 7, 1923.

*To all whom it may concern:*

Be it known that I, ADOLPH A. GAZDA, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has for its object to provide a simple and efficient means for, and method of, effecting the dynamic braking of alternating-current motors.

Numerous methods have been proposed, heretofore, for effecting the dynamic braking of alternating-current motors. Substantially all of such methods involve the use of a separate source of current for energizing the primary windings during the braking periods. In the majority of such arrangements, the primary windings are energized by current from a direct-current source.

It has been discovered that, when the primary windings of squirrel-cage induction motors are disconnected from sources of alternating current, alternating electromotive forces of considerable value are generated in the primary windings during the rotation of the rotors. The voltage across a pair of outer terminals of the primary winding of a motor operating under these conditions is of maximum value at the instant of disconnection from the source of energy and it decreases at a rate exceeding that of the decrease in speed of the motor.

I propose to utilize the electromotive force produced in the manner described above for the purpose of decreasing the speed of the motor by dynamic braking and thereby assist in bringing it to rest. A main switch is provided with what may be termed back contact members by means of which the outer terminals of the primary winding of an induction motor may be short-circuited upon the disconnection of the motor from the line.

Figure 1:
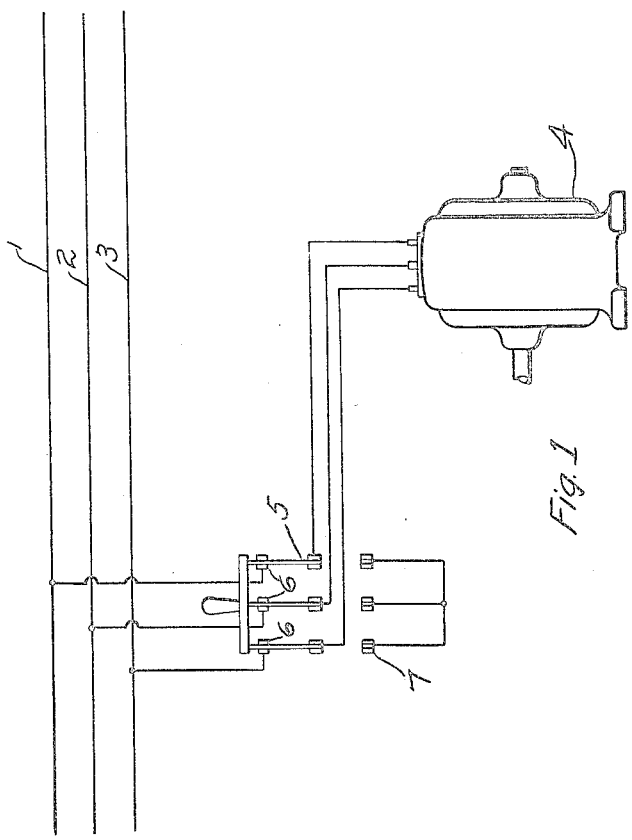
Figure 2:
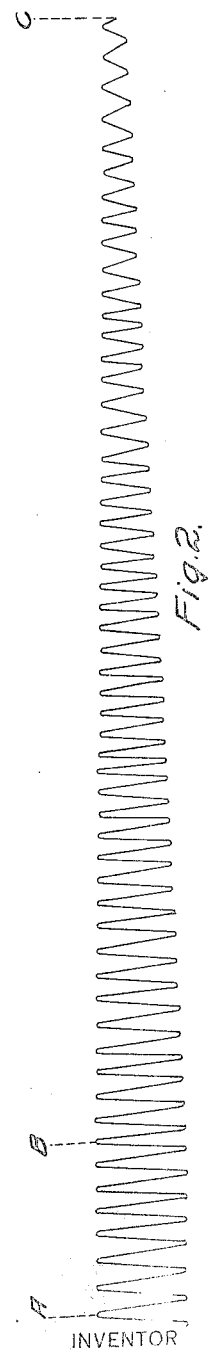

In the accompanying drawing, Fig. 1 is a diagrammatic view of circuits and apparatus embodying my invention. Fig. 2 is a diagrammatic view of curves representing the values of the electromotive force across the terminals of the primary winding before and after the disconnection of the motor from a source of energy.

Referring particularly to Fig. 1, line conductors 1, 2 and 3 supply energy to an alternating-current motor 4, preferably of the squirrel-cage induction type. The connections of the primary winding of the motor to the line conductors 1, 2 and 3 are controlled by a three-pole double-throw switch 5. The switch 5 is provided with stationary contact members 6 that are connected to the respective line conductors 1, 2 and 3 and with stationary contact members 7 that are electrically connected to each other in any suitable manner.

Reference may now be had to Fig. 2, in which curves representing the values of voltage during the connection of the motor to the line and after the line switch is open are diagrammatically illustrated. The portion of the curve between the points A and G represents the values of the voltage between two of the outer terminals of the primary winding during the normal operation of the motor. The portion of the curve between the points B and C represents the values of the primary voltage between the same terminals after the motor has been disconnected from the source of energy.

The generation of the alternating electromotive force under the conditions described above occurs by reason of the fact that considerable energy is stored in the magnetic circuits of the motor. The energy stored in the magnetic circuits energized by the primary winding tends to produce direct currents in the short-circuited bars of the secondary winding. The magnetic field of the rotor rotates past the stationary primary conductors and an electromotive force is generated in the primary windings which continues so long as circulating currents traverse the secondary winding. The electromotive force approaches zero as the energy is dissipated.

It may be assumed that the switch 5 is in its illustrated position and that the motor 4 is operating at substantially normal speed. When it is desired to bring the motor to rest or to materially decrease its speed, the switch 5 is actuated by a quick movement from its illustrated position to effect its disengagement from the contact members 6 and its engagement with the contact members 7. The primary winding is thus disconnected from the source of energy and short-circuited by the switch 5 and the stationary contact members 7 which are electrically connected.

The speed of the motor is material reduced by the resultant dynamic braking of the motor by reason of the currents traversing the primary winding. When the primary winding of the motor is short-circuited, in the manner above described, the motor operates as an alternating-current generator so long as voltage is maintained by the circulating currents in the secondary winding.

The energy stored in magnetic circuits of the motor is utilized for the transformation of the mechanical energy of the rotor into electrical energy. The dissipation of the mechanical energy of the rotor, in this manner, effects a material decrease in the speed of the rotor, whereupon it may be easily and quickly brought to rest by any suitable mechanical means, such, for example, as electromagnetic brakes.

In the arrangement shown and described, a manually operable switch is employed in connection with a three-phase alternating-current motor. It will be understood that any other suitable form of switch may be employed and that the phases of the alternating-current system may be of any convenient number. For example, an electromagnetically operable line switch may be substituted for the manually operable switch without departing from the spirit and scope of my invention.

I claim as my invention:

1. In a motor-control system, the combination with an alternating-current motor of the induction type having a primary winding provided with a single set of terminals, of dynamic-braking means for said motor, said braking means comprising means for closing said winding upon itself upon the the disconnection of said winding from a source of energy whereby said winding is traversed by currents induced only by the action of said motor.

2. In a motor-control system, the combination with an alternating-current induction motor, of means for effecting the dynamic braking thereof, said means comprising means for connecting the terminals of a primary winding of said motor upon the disconnection of said terminals from a source of energy.

3. In a motor-control system, the combination with an alternating-current induction motor having a single set of primary terminals, of dynamic braking means therefor comprising means for successively disconnecting said motor from a source of energy and closing a motor winding upon itself.

4. In a motor-control system, the combination with an alternating-current induction motor having a primary winding, of means for effecting the dynamic braking of said motor, said means comprising a double-throw switch for closing said winding upon itself upon the disconnection of the latter from a source of energy.

5. In a motor-control system, the combination with an alternating-current induction motor having a single primary winding the terminals of which may be connected to a source of energy, of dynamic-braking means for said motor comprising means for connecting said terminals together to form a closed circuit for said winding upon the disconnection of said winding from said source.

6. The method of braking an alternating-current motor of the induction type which consists in connecting the terminals of a winding of said motor in a closed, self-contained circuit upon the disconnection of said terminals from a source of energy and permitting energy induced in said motor to traverse said winding to effect the braking of said motor.

7. The method of braking an alternating-current motor of the induction type having primary and secondary windings which comprises disconnecting the terminals of said primary winding from a source of current and thereupon connecting said terminals to each other to cause currents to traverse said primary winding by reason of the operation of said motor as a generator.

In testimony whereof, I have hereunto subscribed my name this 29th day of January 1917.

ADOLPH A. GAZDA.